US010406863B2

(12) United States Patent
Hamanaka

(10) Patent No.: US 10,406,863 B2
(45) Date of Patent: Sep. 10, 2019

(54) PNEUMATIC TIRE

(71) Applicant: The Yokohama Rubber Co., LTD., Minato-ku, Tokyo (JP)

(72) Inventor: Hideki Hamanaka, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 728 days.

(21) Appl. No.: 14/435,145

(22) PCT Filed: Oct. 10, 2012

(86) PCT No.: PCT/JP2012/076249
§ 371 (c)(1),
(2) Date: Apr. 10, 2015

(87) PCT Pub. No.: WO2014/057551
PCT Pub. Date: Apr. 17, 2014

(65) Prior Publication Data
US 2015/0273947 A1    Oct. 1, 2015

(51) Int. Cl.
*B60C 3/04* (2006.01)
*B60C 9/18* (2006.01)
(Continued)

(52) U.S. Cl.
CPC .................. *B60C 9/20* (2013.01); *B60C 3/04* (2013.01); *B60C 7/00* (2013.01); *B60C 9/185* (2013.01);
(Continued)

(58) Field of Classification Search
CPC ............ B60C 9/2204; B60C 3/04; B60C 9/22
See application file for complete search history.

(56) References Cited

U.S. PATENT DOCUMENTS 5,662,752 A * 9/1997 Nakano .................... B60C 9/20
152/526
5,871,597 A * 2/1999 Vasseur .................... B60C 1/00
152/209.5

(Continued)

FOREIGN PATENT DOCUMENTS

JP       H04-066304          3/1992
JP       2001-522748         11/2001
(Continued)

OTHER PUBLICATIONS

Machine Translation: JP 4918948 B1; Mashiyama; Tatsuya; no date.*
International Search Report for International Application No. PCT/JP2012/076249 dated Dec. 11, 2012, 4 pages, Japan.

*Primary Examiner* — Robert C Dye
*Assistant Examiner* — Kendra Ly
(74) *Attorney, Agent, or Firm* — Thorpe North & Western

(57) ABSTRACT

The pneumatic tire includes a carcass layer, a belt layer disposed outward of the carcass layer in the tire radial direction, and a tread rubber disposed outward of the belt layer in the tire radial direction. Moreover, the belt layer is formed by laminating a pair of cross belts having a belt angle with an absolute value from 10° to 45° both inclusive and mutually opposite signs, and the circumferential reinforcing layer having a belt angle within a range of ±5° relative to the tire circumferential direction. Moreover, the distance (Gcc) from the tread profile to the tire inner circumferential surface along the tire equatorial plane and the distance (Gsh) from the tread edge to the tire inner circumferential surface have a relationship satisfying 1.10≤Gsh/Gcc.

20 Claims, 11 Drawing Sheets

(51) Int. Cl.
- *B60C 9/20* (2006.01)
- *B60C 9/22* (2006.01)
- *B60C 9/28* (2006.01)
- *B60C 7/00* (2006.01)
- *B60C 11/00* (2006.01)

(52) U.S. Cl.
CPC .............. *B60C 9/2006* (2013.01); *B60C 9/28* (2013.01); *B60C 9/22* (2013.01); *B60C 2009/1828* (2013.01); *B60C 2009/2064* (2013.01); *B60C 2009/2083* (2013.01); *B60C 2009/2238* (2013.01); *B60C 2009/2242* (2013.01); *B60C 2009/2266* (2013.01); *B60C 2011/0033* (2013.01); *B60C 2200/06* (2013.01); *Y10T 152/10765* (2015.01)

(56) References Cited

U.S. PATENT DOCUMENTS

| | | |
|---|---|---|
| 6,401,778 B1 | 6/2002 | Cluzel |
| 6,668,889 B1 * | 12/2003 | Losey ........................ B60C 9/20 152/527 |
| 2004/0069392 A1 * | 4/2004 | Maruoka ................... B60C 3/04 152/454 |
| 2006/0169380 A1 | 8/2006 | Radulescu et al. |
| 2006/0169381 A1 * | 8/2006 | Radulescu ............ B60C 9/2006 152/531 |
| 2006/0169383 A1 | 8/2006 | Radulescu et al. |
| 2009/0277552 A1 * | 11/2009 | Maruyama ................ B60C 3/04 152/454 |
| 2009/0277557 A1 * | 11/2009 | Suzuki ................... B60C 9/2006 152/532 |
| 2010/0294410 A1 * | 11/2010 | Yoshikawa ........... B60C 9/2006 152/454 |
| 2012/0097307 A1 * | 4/2012 | Delebecq .................. B60C 3/04 152/527 |
| 2014/0305566 A1 * | 10/2014 | Mashiyama .............. B60C 9/18 152/454 |
| 2014/0326380 A1 | 11/2014 | Kotoku |

FOREIGN PATENT DOCUMENTS

| | | | |
|---|---|---|---|
| JP | 2008-001264 | 1/2008 | |
| JP | 4642760 | 3/2011 | |
| JP | 4663638 | 4/2011 | |
| JP | 4663639 | 4/2011 | |
| JP | 4918948 | 4/2012 | |
| JP | 4918948 B1 * | 4/2012 | ............. B60C 9/18 |
| JP | 4984013 | 7/2012 | |
| WO | WO-9858810 A1 * | 12/1998 | ............. B60C 11/00 |
| WO | WO-9924269 | 5/1999 | |
| WO | WO 2005/016666 | 2/2005 | |
| WO | WO 2005/016667 | 2/2005 | |
| WO | WO 2005/016668 | 2/2005 | |
| WO | WO 2007/148447 | 12/2007 | |
| WO | WO 2013/042256 | 3/2013 | |

* cited by examiner

COMPARATIVE EXAMPLE
(Gsh/Gcc=1.06)

WORKING EXAMPLES
(Gsh/Gcc=1.20)

| | CONVENTIONAL EXAMPLE | COMPARATIVE EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 |
|---|---|---|---|---|---|---|---|---|
| CIRCUMFERENTIAL REINFORCING LAYER | NONE | YES | YES | YES | YES | YES | YES | YES |
| Gsh/Gcc | 1.06 | 1.06 | 1.10 | 1.20 | 1.25 | 1.10 | 1.25 | 1.25 |
| Ws/TW | - | 0.65 | 0.65 | 0.65 | 0.65 | 0.70 | 0.70 | 0.80 |
| Dr/Ws | - | 0.020 | 0.020 | 0.020 | 0.020 | 0.020 | 0.020 | 0.020 |
| ANGLE OF LARGE ANGLE BELT (°) | 40 | 40 | 40 | 40 | 40 | 40 | 40 | 40 |
| NUMBER OF ENDS OF LARGE ANGLE BELT (ENDS/50 mm) | 13 | 13 | 13 | 13 | 13 | 13 | 13 | 13 |
| Wb1/Wb3 | 0.80 | 0.80 | 0.80 | 0.80 | 0.80 | 0.80 | 0.80 | 0.80 |
| De/Dcc | - | 0.88 | 0.88 | 0.88 | 0.93 | 0.93 | 0.93 | 0.93 |
| BREAKING ELONGATION λs (%) OF CIRCUMFERENTIAL REINFORCING LAYER | - | 150 | 150 | 150 | 150 | 150 | 150 | 150 |
| Belt-edge-separation resistance performance | 100 | 103 | 105 | 108 | 110 | 108 | 111 | 113 |

FIG. 8A

| | WORKING EXAMPLE 7 | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 | WORKING EXAMPLE 14 | WORKING EXAMPLE 15 | WORKING EXAMPLE 16 |
|---|---|---|---|---|---|---|---|---|---|---|
| CIRCUMFERENTIAL REINFORCING LAYER | YES | YES | YES | YES | YES | YES | YES | YES | YES | YES |
| Gsh/Gcc | 1.25 | 1.10 | 1.10 | 1.20 | 1.25 | 1.25 | 1.25 | 1.20 | 1.10 | 1.25 |
| Ws/TW | 0.90 | 1.00 | 0.65 | 0.70 | 0.80 | 0.80 | 0.80 | 0.70 | 0.65 | 0.80 |
| Dr/Ws | 0.020 | 0.020 | 0.010 | 0.010 | 0.010 | 0.005 | -0.010 | -0.010 | -0.010 | -0.020 |
| ANGLE OF LARGE ANGLE BELT (°) | 40 | 40 | 40 | 40 | 40 | 40 | 40 | 40 | 40 | 40 |
| NUMBER OF ENDS OF LARGE ANGLE BELT (ENDS/50 mm) | 13 | 13 | 13 | 13 | 13 | 13 | 13 | 13 | 13 | 13 |
| Wb1/Wb3 | 0.80 | 0.80 | 0.80 | 0.80 | 0.80 | 0.80 | 0.80 | 0.80 | 0.80 | 0.80 |
| De/Dcc | 0.93 | 0.93 | 0.93 | 0.93 | 0.93 | 0.93 | 0.93 | 0.93 | 0.93 | 0.93 |
| BREAKING ELONGATION λs (%) OF CIRCUMFERENTIAL REINFORCING LAYER | 150 | 150 | 150 | 150 | 150 | 150 | 150 | 150 | 150 | 150 |
| Belt-edge-separation resistance performance | 111 | 108 | 108 | 110 | 114 | 115 | 114 | 110 | 108 | 110 |

FIG. 8B

| | WORKING EXAMPLE 17 | WORKING EXAMPLE 18 | WORKING EXAMPLE 19 | WORKING EXAMPLE 20 | WORKING EXAMPLE 21 | WORKING EXAMPLE 22 | WORKING EXAMPLE 23 |
|---|---|---|---|---|---|---|---|
| CIRCUMFERENTIAL REINFORCING LAYER | YES | YES | YES | YES | YES | YES | YES |
| Gsh/Gcc | 1.25 | 1.25 | 1.25 | 1.25 | 1.25 | 1.25 | 1.25 |
| Ws/TW | 0.80 | 0.80 | 0.80 | 0.80 | 0.80 | 0.80 | 0.80 |
| Dr/Ws | 0.005 | 0.005 | 0.005 | 0.005 | 0.005 | 0.005 | 0.005 |
| ANGLE OF LARGE ANGLE BELT (°) | 45 | 50 | 60 | 70 | 60 | 60 | 60 |
| NUMBER OF ENDS OF LARGE ANGLE BELT (ENDS/50 mm) | 13 | 13 | 13 | 13 | 15 | 20 | 20 |
| Wb1/Wb3 | 0.80 | 0.80 | 0.80 | 0.80 | 0.80 | 0.80 | 0.85 |
| De/Dcc | 0.93 | 0.93 | 0.93 | 0.93 | 0.93 | 0.93 | 0.93 |
| BREAKING ELONGATION λs OF CIRCUMFERENTIAL REINFORCING LAYER (%) | 150 | 150 | 150 | 150 | 150 | 150 | 150 |
| Belt-edge-separation resistance performance | 116 | 117 | 119 | 117 | 120 | 122 | 123 |

FIG. 9A

| | WORKING EXAMPLE 24 | WORKING EXAMPLE 25 | WORKING EXAMPLE 26 | WORKING EXAMPLE 27 | WORKING EXAMPLE 28 | WORKING EXAMPLE 29 |
|---|---|---|---|---|---|---|
| CIRCUMFERENTIAL REINFORCING LAYER | YES | YES | YES | YES | YES | YES |
| Gsh/Gcc | 1.25 | 1.25 | 1.25 | 1.25 | 1.25 | 1.25 |
| Ws/TW | 0.80 | 0.80 | 0.80 | 0.80 | 0.80 | 0.80 |
| Dr/Ws | 0.005 | 0.005 | 0.005 | 0.005 | 0.005 | 0.005 |
| ANGLE OF LARGE ANGLE BELT (°) | 60 | 60 | 60 | 60 | 60 | 60 |
| NUMBER OF ENDS OF LARGE ANGLE BELT (ENDS/50 mm) | 20 | 20 | 20 | 20 | 20 | 20 |
| Wb1/Wb3 | 0.95 | 1.05 | 0.95 | 0.95 | 0.95 | 0.95 |
| De/Dcc | 0.93 | 0.93 | 0.95 | 1.00 | 1.00 | 1.00 |
| BREAKING ELONGATION $\lambda s$ OF CIRCUMFERENTIAL REINFORCING LAYER (%) | 150 | 150 | 150 | 150 | 200 | 250 |
| Belt-edge-separation resistance performance | 124 | 123 | 125 | 126 | 128 | 130 |

FIG. 9B

PNEUMATIC TIRE

TECHNICAL FIELD

The present technology relates to a pneumatic tire, and more particularly relates to a pneumatic tire with improved belt-edge-separation resistance performance.

BACKGROUND

Recent heavy duty tires mounted on trucks, buses, and the like maintain their tread shape due to the tires having a low aspect ratio while having a circumferential reinforcing layer disposed in the belt layer. The circumferential reinforcing layer is a belt ply having a belt angle that is substantially 0° with respect to the tire circumferential direction, and is disposed laminated upon a pair of cross belts. The technology disclosed in Japanese Patent Nos. 4642760B, 4663638B and 4663639B includes conventional pneumatic tires that are configured in this manner. There is a problem that it is necessary to suppress separation of peripheral rubber at an end portion of a belt ply

SUMMARY

Thus, the present technology provides a pneumatic tire with improved belt-edge-separation resistance performance.

A pneumatic tire according to the present technology has: a carcass layer, a belt layer disposed outward of the carcass layer in a tire radial direction, and a tread rubber disposed outward of the belt layer in the tire radial direction. The belt layer is formed by laminating a pair of cross belts having a belt angle with an absolute value from 10° to 45° both inclusive and mutually opposite signs, and a circumferential reinforcing layer having a belt angle within a range of ±5° relative to a tire circumferential direction. A distance Gcc from a tread profile to a tire inner circumferential surface along a tire equatorial plane and a distance Gsh from a tread edge to the tire inner circumferential surface have a relationship satisfying 1.10≤Gsh/Gcc.

In the pneumatic tire according to the present technology, because the ratio Gsh/Gcc is set to a high value, the tread face as a whole has a flat (substantially parallel to the tire rotational axis) shape, and further, the volume of tread rubber (the distance Gsh) in a shoulder portion is assured. Thus, due to the fact that strain of each belt ply is reduced when the tire contacts the ground, there is an advantage that the belt-edge-separation resistance performance is improved.

BRIEF DESCRIPTION OF THE DRAWINGS

FIGS. 8A-8B include a table showing results of performance testing of pneumatic tires according to embodiments of the present technology.

FIGS. 9A-9B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
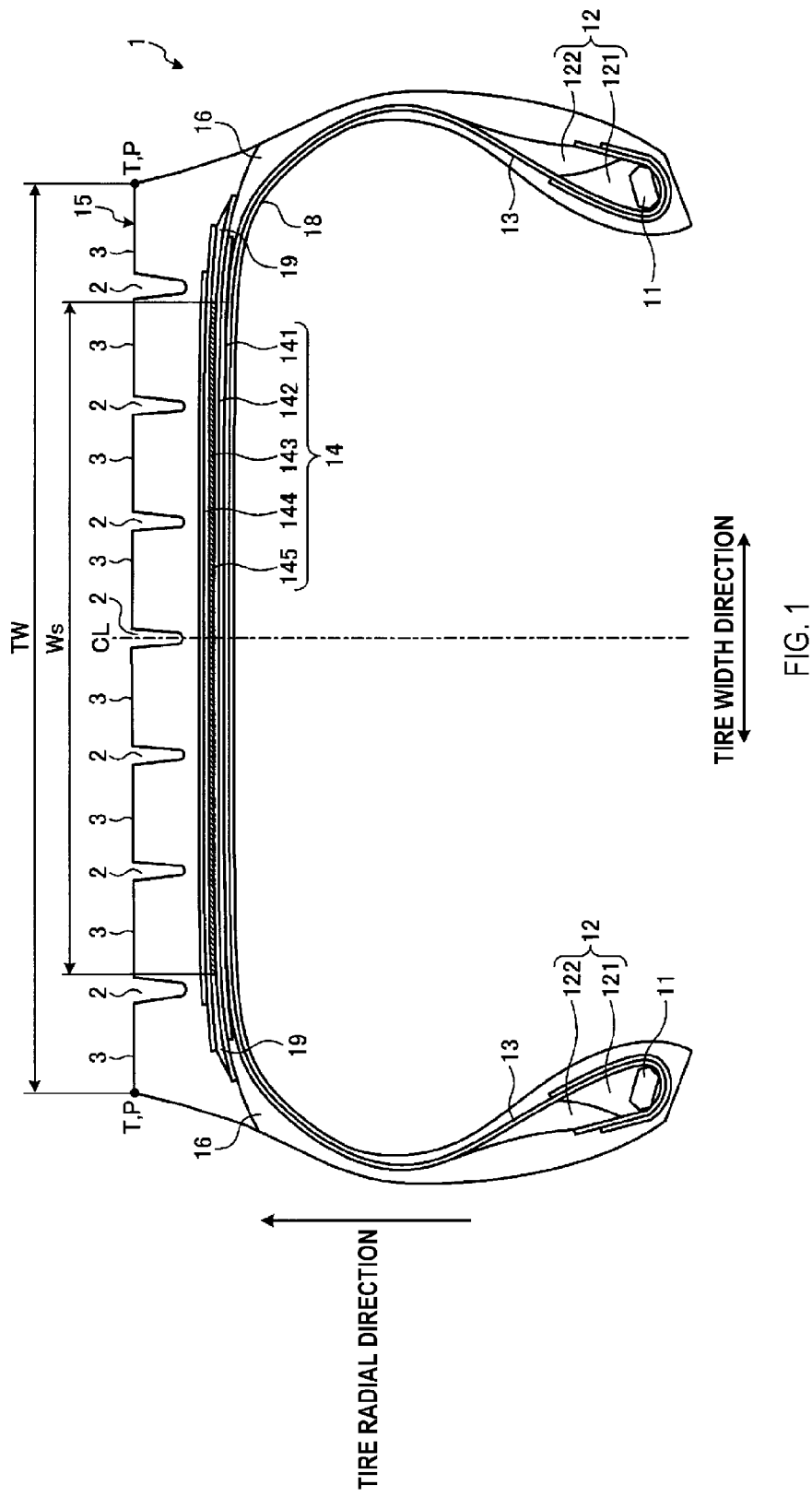
FIG. 1 is a cross-sectional view in a tire meridian direction illustrating a pneumatic tire 1 according to an embodiment of the present technology.

FIG. 1 is a cross-sectional view in a tire meridian direction illustrating a pneumatic tire 1 according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and constitute cores of left and right bead portions. The pair of bead fillers 12, 12 are formed from a lower filler 121 and an upper filler 122, and are disposed on a periphery of the pair of bead cores 11, 11 in the tire radial direction so as to reinforce the bead portions.

The carcass layer 13 stretches between the left and right side bead cores 11 and 11 in toroidal form, forming a framework for the tire. Additionally, both end portions of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction) with an absolute value from 85° to 95° both inclusive.

The belt layer 14 is formed by laminating a plurality of belt plies 141 to 145, and disposed to extend over a periphery of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16, 16 is disposed on both outer sides of the carcass layer 13 in the tire width direction, so as to form left and right sidewall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. The land portions 3 are formed of blocks that are segmented in the circumferential direction by ribs or lug grooves (not illustrated on the drawings) that continue in the tire circumferential direction.

Here, "circumferential main grooves" refers to circumferential grooves having a groove width of 5.0 mm or greater. The groove width of the circumferential main grooves is measured excluding the notched portions and/or the chamfered portions formed at the groove opening portion.

Additionally, in the pneumatic tire 1, the left and right outermost circumferential main grooves 2, 2 in the tire width direction are referred to as outermost circumferential main grooves. Moreover, the left and right land portions 3, 3 outward in the tire width direction that are defined by the left and right outermost circumferential main grooves 2, 2 are referred to as shoulder land portions.

[Belt Layer]

Figure 2:
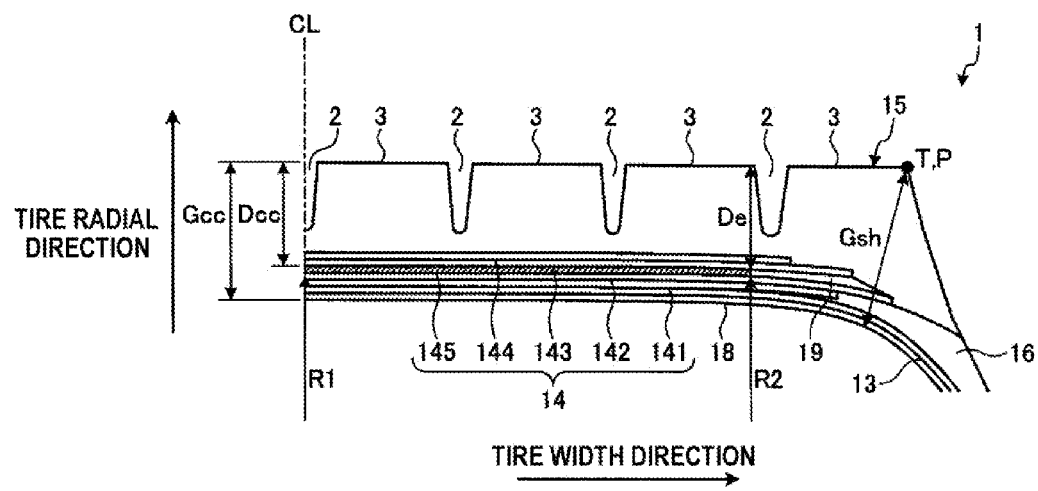
FIG. 2 is an explanatory view illustrating a belt layer of the pneumatic tire depicted in FIG. 1.
Figure 3:
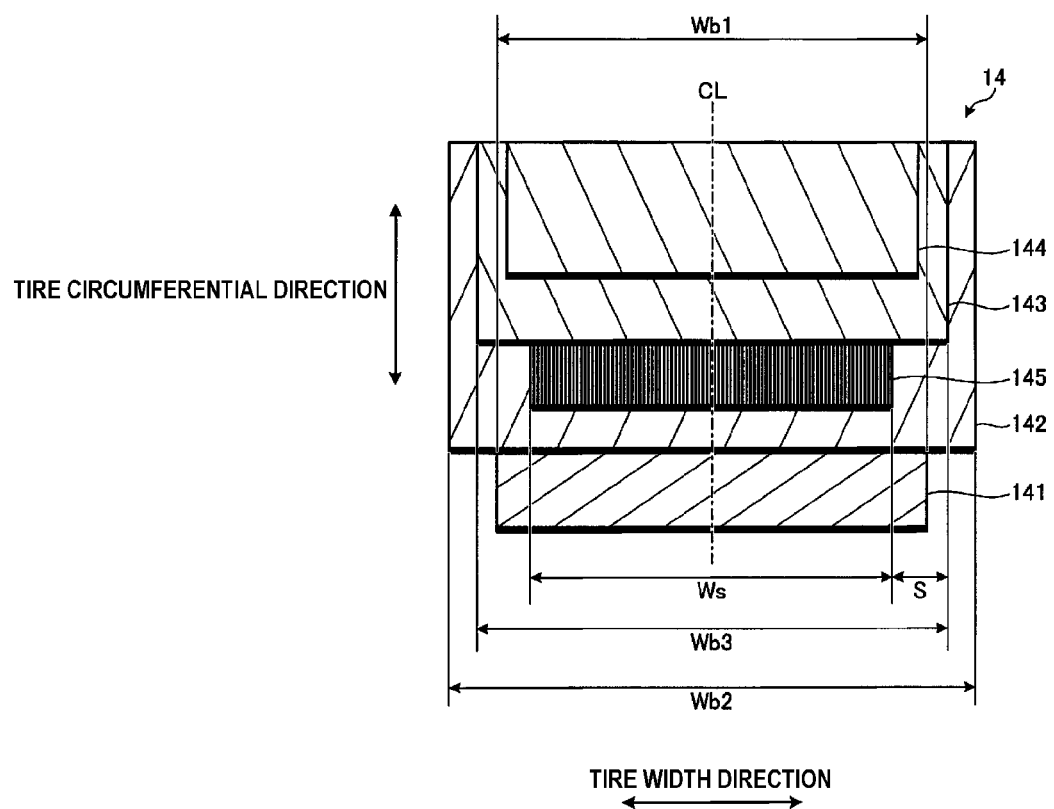
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed by being wound and mounted onto the periphery of the carcass layer 13 (see FIG. 2).

The large angle belt 141 is configured by a plurality of belt cords formed from steel or organic fibers, covered by coating rubber, and subjected to a rolling process, having a belt angle (angle of inclination of the fiber direction of the belt cords with respect to the tire circumferential direction) with an absolute value from 45° to 70° both inclusive. Moreover, the large angle belt 141 is disposed laminated outward in the tire radial direction of the carcass layer 13.

The pair of cross belts 142, 143 is configured by a plurality of belt cords formed from steel or organic fibers, covered by coating rubber, and subjected to a rolling process, having a belt angle with an absolute value from 10° to 45° both inclusive. Additionally, the pair of cross belts 142, 143 has belt angles that are of mutually opposite signs, and are laminated such that the fiber directions of the belt cords intersect each other (a crossply structure). In the following description, the cross belt 142 positioned inward in the tire radial direction is referred to as "inner-side cross belt", and the cross belt 143 positioned outward in the tire radial direction is referred to as "outer-side cross belt". Three or more cross belts may be disposed laminated (not illustrated on the drawings). Moreover, in this embodiment, the pair of cross belts 142, 143 are disposed laminated outward in the tire radial direction of the large angle belt 141.

Also, the belt cover 144 is configured by a plurality of belt cords formed from steel or organic fibers, covered by coating rubber, and subjected to a rolling process, having a belt angle with an absolute value from 10° to 45° both inclusive. Moreover, the belt cover 144 is disposed laminated outward in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is configured by belt cords formed from steel, and covered by coating rubber that are wound in a spiral manner with an inclination within a range of ±5° relative to the tire circumferential direction.

Moreover, in this embodiment, the circumferential reinforcing layer 145 is disposed interposed between the pair of cross belts 142, 143. Additionally, the circumferential reinforcing layer 145 is disposed inward of left and right edges of the pair of cross belts 142, 143 in the tire width direction. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability is improved.

In the pneumatic tire 1, the belt layer 14 may have an edge cover (not illustrated on the drawings). Generally, the edge cover is configured by a plurality of belt cords formed from steel or organic fibers covered by coating rubber and subjected to a rolling process, having a belt angle with an absolute value from 0° to 5° both inclusive. Additionally, edge covers are disposed outward of the left and right edges of the outer-side cross belt 143 (or the inner-side cross belt 142) in the tire radial direction. The edge covers improve the uneven wear resistance performance of the tire by reducing the difference in radial growth between the center area and the shoulder area of the tread portion, by exhibiting a hoop effect.

[Belt-Edge Separation Suppressing Structure]

Recent heavy duty tires mounted on trucks, buses, and the like maintain their tread shape due to the tires having a low aspect ratio while having a circumferential reinforcing layer disposed in the belt layer. Specifically, by disposing the circumferential reinforcing layer at the tread center region, and exploiting the hoop effect thereof, radial growth of the tread is suppressed and the tread shape is maintained.

In such a configuration, as the rigidity of the belt layer in the tire circumferential direction is increased due to the circumferential reinforcing layer, there is a problem that separation of the peripheral rubber at the edge portion of the belt ply occurs easily. Such a problem clearly appears, in particular, under high inner pressure and heavy load long-term service conditions.

Here, in the pneumatic tire 1, the configuration described below is adopted in order to improve tire durability performance by suppressing the occurrence of the above-described separation (see FIG. 1 to FIG. 3).

As illustrated in FIG. 2, in the pneumatic tire 1, a distance Gcc from the tread profile to the tire inner circumferential surface along the tire equatorial plane CL and a distance Gsh from the tread edge P to the tire inner circumferential surface have a relationship satisfying $1.10 \leq Gsh/Gcc$. In particular, as shown by the results of a performance test to be described later (see FIGS. 8A-8B), this ratio Gsh/Gcc preferably satisfies $1.20 \leq Gsh/Gcc$. This results in effective improvement of the belt-edge-separation resistance performance of the tire.

On the other hand, the upper limit of the ratio Gsh/Gcc is not particularly limited, but when the tire is assembled on a specified rim, filled with specified internal pressure, and in an unloaded state, the radius along the tread edge P of the tread profile is preferably less than or equal to the radius along the tire equatorial plane CL. That is, the tread profile has a linear shape or an arc shape having a center inward in the tire radial direction, and is configured so as not to have a reverse R shape (arc shape having a center outward in the tire radial direction). For example, in a configuration having a square shoulder portion as in FIG. 2, the upper limit of the ratio Gsh/Gcc is approximately from 1.4 to 1.5. On the other hand, in a configuration having a round shoulder portion as in FIG. 6, the upper limit of the ratio Gsh/Gcc is approximately from 1.3 to 1.4.

The distance Gcc is measured as the distance from the intersection of the tire equatorial plane CL and the tread profile to the intersection of the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. In such a configuration, the distance Gcc and the distance Gsh are measured on the basis of the outer surface of the inner liner 18 (tire inner circumferential surface).

The tread edge P (1) refers to a point of the tread edge portion in a configuration having a square shaped shoulder portion. For example, in the configuration illustrated in FIG. 2, the tread edge P and a tire ground contact edge T coincide with each other due to the shoulder portion having a square shape. Conversely, (2) in a configuration in which the shoulder portion has a round shape, as illustrated in the modification example of FIG. 6 to be described later, taking an intersection P' between the tread portion profile and the side wall portion profile when viewed as a cross-section from the tire meridian direction, the tread edge P is taken as the bottom of a perpendicular line drawn from the intersection P' to the shoulder portion.

Additionally, the "tire ground contact edge T" refers to the maximum width position in a tire axial direction of a contact surface between the tire and a flat plate in a configuration in which the tire is assembled on a specified rim, filled with specified internal pressure, placed perpendicularly to the flat plate in a static state, and loaded with a load corresponding to a specified load.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified internal pressure is an air pressure of 180 kPa, and the specified load is 88% of the maximum load capacity.

Figure 4A:
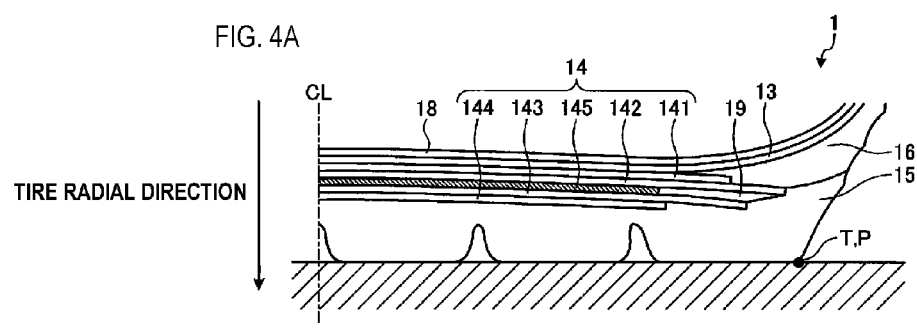
FIGS. 4A and 4B are explanatory views illustrating the effect of the pneumatic tire depicted in FIG. 1.
Figure 4B:
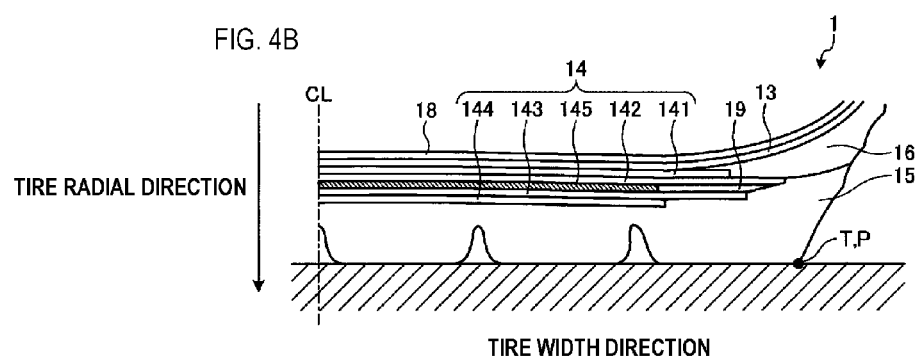
Figure 5:
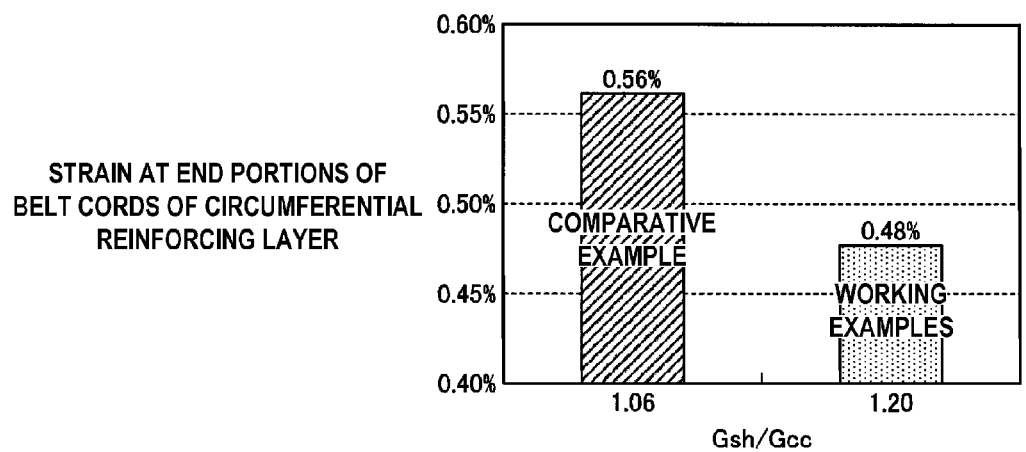
FIG. 5 is an explanatory view illustrating the effect of the pneumatic tire depicted in FIG. 1.

FIGS. 4A, 4B, and 5 are explanatory views illustrating the operation of the pneumatic tire depicted in FIG. 1. In these diagrams, FIGS. 4A and 4B illustrates the states of ground contact of tires having mutually different ratios Gsh/Gcc, and FIG. 5 illustrates strain at the end portions of belt cords of the circumferential reinforcing layer 145 at the time of ground contact of each of the tires of FIGS. 4A and 4B.

In the tire of a comparative example of FIG. 4A, in the configurations of FIGS. 1 to 3, the ratio Gsh/Gcc is set to a small value (Gsh/Gcc=1.06). For this reason, when the tire does not contact the ground, the tread profile has a counterbore shape in which the outside diameter decreases from the tire equatorial plane CL toward the tread edge P (not illustrated). Thus, when the tire contacts the ground, as depicted in FIG. 4A, the tread rubber 15 on the shoulder portion deforms greatly on the road surface side (outward in the tire radial direction), and each of the belt plies 141 to 145 of the belt layer 14 curves greatly on the road surface side (outward in the tire radial direction) toward the outer side in the tire width direction (see FIG. 4A). As a result, as the strain of each of the belt plies 141 to 145 becomes large, (1) it is easy for separation to occur in the peripheral rubber at the end portion of each of the belt plies 141 to 145, and (2) it is easy for separation to occur in the coating rubber between the adjacent belt plies 141 to 145. In particular, separation of the peripheral rubber at the end portion of the circumferential reinforcing layer 145 and separation of the coating rubber between the circumferential reinforcing layer 145 and the pair of cross belts 142, 143 that sandwich the circumferential reinforcing layer 145 occur easily.

In contrast, in the tire of a comparative example of FIG. 4B, in the configurations of FIGS. 1 to 3, the ratio Gsh/Gcc is set to a large value (Gsh/Gcc=1.20). For this reason, when the tire does not contact the ground, the difference in diameter between the outside diameter of the tread profile at the tire equatorial plane CL and the outside diameter at the tread edge P is small, and as a whole, the tread face has a flat (substantially parallel to the tire rotational axis) shape (see FIGS. 1 and 2). Furthermore, the volume (distance Gsh) of the tread rubber 15 at the shoulder portion is assured, and rigidity of the shoulder land portion 3 is assured. Thus, deformation of the shoulder portion is suppressed when the tire contacts the ground, and the strain of each of the belt plies 141 to 145 is reduced (see FIG. 4B). As a result, (1) the occurrence of separation of the peripheral rubber of the end portions of each of the belt plies 141 to 145 and (2) the occurrence of separation of the coating rubber between the adjacent belt plies 141 to 145 are suppressed.

Additionally, in the pneumatic tire 1, in FIG. 1, a tread width TW and a width Ws of the circumferential reinforcing layer 145 have a relationship satisfying $0.70 \leq Ws/TW \leq 0.90$.

The tread width TW is the distance in the direction of the tire rotational axis between the left and right tread edges P, P, measured when the tire is assembled on a specified rim, inflated to a specified internal pressure and is in an unloaded state.

The width Ws of the circumferential reinforcing layer 145 is the distance measured between the left and right end portions of the circumferential reinforcing layer 145 in the tire rotation direction when the tire is assembled on a specified rim, is inflated to a specified internal pressure, and is in an unloaded state. The width Ws of the circumferential reinforcing layer 145 is the distance between the outermost end portions of the divided portions when the circumferential reinforcing layer 145 has a structure that is divided in the tire width direction (not illustrated in the drawings).

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer 145 and the tread width TW is stipulated by conversion to half width based on the tire equatorial plane CL. Specifically, a distance TW' (not illustrated) from the tire equatorial plane CL to the tread edge P and the distance Ws' from the tire equatorial plane CL to the end portion of the circumferential reinforcing layer 145 are set so as to have the relationship satisfying $0.70 \leq Ws'/TW' \leq 0.90$.

Further, in FIG. 2, a difference Dr between a radius R1 of the circumferential reinforcing layer 145 along the tire equatorial plane CL and a radius R2 at the end portion outward in the tire width direction (=R1−R2), and the width Ws of the circumferential reinforcing layer 145 have a relationship satisfying $-0.010 \leq Dr/Ws \leq 0.010$. When the sign of the difference Dr is positive, the radius R1 of the circumferential reinforcing layer 145 along the tire equatorial plane CL is larger than the radius R2 at the end portion, and, in a state illustrated in FIG. 2, the circumferential reinforcing layer 145 corresponds to a downward curve to the right. In contrast, when the sign of the difference Dr is negative, in the state illustrated in FIG. 2, the circumferential reinforcing layer 145 corresponds to an upward curve to the right.

The radii R1, R2 of the circumferential reinforcing layer 145 are measured as a distance from a tire rotational axis to a center line of the circumferential reinforcing layer 145, when viewed as a cross-section from the tire meridian direction, when the tire is assembled on a specified rim, inflated to a specified internal pressure, and no load is applied.

Further, in FIG. 2, a distance Dcc along the tire equatorial plane CL from the circumferential reinforcing layer 145 to the tread profile, and a distance De from the end portion of the circumferential reinforcing layer 145 to the tread profile have a relationship satisfying $0.95 \leq De/Dcc \leq 1.05$. As a result, the circumferential reinforcing layer 145 is disposed substantially parallel to the tire rotational axis.

The distance Dcc and the distance De are respectively measured as distances, when viewed as a cross-section from the tire meridian direction, between a virtual line, which links an outer side surface in the tire radial direction of the group of belt cords disposed at respective positions of the circumferential reinforcing layer 145, and the tread profile, when the tire is assembled on a specified rim, inflated to a specified internal pressure, and no load is applied.

Furthermore, in the pneumatic tire 1, the width Wb1 of the large angle belt 141 and the width Wb3 of the narrower cross belt 143 of the pair of cross belts 142, 143 preferably have a relationship satisfying $0.85 \leq Wb1/Wb3 \leq 1.05$ (see FIG. 3). As a result, the ratio Wb1/Wb3 is made appropriate.

The width Wb1 of the large angle belt 141 and the width Wb3 of the cross belt 143 are measured as the distance in the tire width direction when the tire is assembled on a specified rim, inflated to a specified internal pressure, and no load is applied.

In the configuration in FIG. 1, the belt layer 14 has a structure with left-right symmetry around the tire equatorial plane CL as illustrated in FIG. 3, and the width Wb1 of the large angle belt 141 and the width Wb3 of the narrower cross belt 143 have a relationship satisfying Wb1<Wb3. As a result, an edge portion of the large angle belt 141 is disposed inward of the edge portion of the narrower cross belt 143 in the tire width direction in a region on either side of the tire equatorial plane CL. However, the configuration is not limited thereto, and the width Wb1 of the large angle belt 141 and the width Wb3 of the narrower cross belt 143 may have a relationship satisfying Wb1≥Wb3 (not illustrated in the drawings).

Moreover, the belt cords of the large angle belt 141 are preferably steel wire, and the large angle belt 141 preferably has the number of ends from 15 ends/50 mm to 25 ends/50 mm both inclusive (see FIGS. 4A and 4B). Moreover, the belt cords of the pair of cross belts 142, 143 are preferably steel wire, and the pair of cross belts 142, 143 preferably have the number of ends from 18 ends/50 mm to 28 ends/50 mm both inclusive. Also, the belt cords that constitute the circumferential reinforcing layer 145 are steel wire, and the circumferential reinforcing layer 145 preferably has the number of ends from 17 ends/50 mm to 30 ends/50 mm both inclusive. As a result, the strengths of the belt plies 141, 142, 143, 145 are properly assured.

Moreover, a modulus E1 at 100% elongation of the coating rubber of the large angle belt 141 and a modulus Es at 100% elongation of the coating rubber of the circumferential reinforcing layer 145 preferably have a relationship satisfying $0.90 \leq Es/E1 \leq 1.10$ (see FIGS. 4A and 4B). Moreover, moduli E2, E3 at 100% elongation of the coating rubbers of the pair of cross belts 142, 143, and the modulus Es at 100% elongation of the coating rubber of the circumferential reinforcing layer 145 preferably have a relationship satisfying $0.90 \leq Es/E2 \leq 1.10$ and $0.90 \leq Es/E3 \leq 1.10$. Moreover, the modulus Es at 100% elongation of the coating rubber of the circumferential reinforcing layer 145 preferably is in a range of $4.5 \text{ MPa} \leq Es \leq 7.5 \text{ MPa}$. As a result, the moduli of the belt plies 141, 142, 143, 145 are made appropriate.

The modulus at 100% elongation is measured in a tensile test at ambient temperature in conformance with JIS K6251 (using dumbbell no. 3).

Moreover, a breaking elongation λ1 of the coating rubber of the large angle belt 141 is preferably equal to or greater than 200% (see FIGS. 4A and 4B). Moreover, breaking elongations λ2, λ3 of the coating rubbers of the pair of cross belts 142, 143 are both preferably equal to or greater than 200%. Furthermore, a breaking elongation λs of the coating rubber of the circumferential reinforcing layer 145 is preferably equal to or greater than 200%. As a result, the durability of the belt plies 141 142, 143, 145 is properly assured.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min.

Elongation of the belt cords that configure the circumferential reinforcing layer 145, when the belt cords are components, is preferably from 1.0% to 2.5% both inclusive when the tensile load is from 100 N to 300 N, and when the belt cords are of a tire (when removed from the tire), the elongation is preferably from 0.5% to 2.0% both inclusive when the tensile load is from 500 N to 1000 N. The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, as illustrated in FIG. 3, the circumferential reinforcing layer 145 is preferably disposed inward of the left and right edge portions of the narrower cross belt 143 of the pair of cross belts 142, 143 in the tire width direction. Also, preferably the width Wb3 of the narrower cross belt 143 and the distance S from the edge portion of the circumferential reinforcing layer 145 to the edge portion of the narrower cross belt 143 have the relationship 0.03≤S/Wb3≤0.12. As a result, the distance between the end portions of the width Wb3 of the cross belt 143 and the end portions of the circumferential reinforcing layer 145 are properly assured. This point is the same even if the circumferential reinforcing layer 145 has a divided structure (not illustrated on the drawings).

The distance S of the circumferential reinforcing layer 145 is measured as a distance in the tire width direction when the tire is assembled on a specified rim, inflated to a specified internal pressure, and no load is applied.

Further, in the configuration in FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably not greater than 12 mm. As a result, a plurality of wires (from 2 to 5 wires both inclusive) can be wound properly at a slant within a range of ±5° relative to the tire circumferential direction.

Additionally, in the configuration in FIG. 2, the circumferential reinforcing layer 145 is disposed interposed between the pair of cross belts 142, 143 (see FIG. 2). However, the circumferential reinforcing layer 145 is not limited as such, and may also disposed outward of the pair of cross belts 142, 143 (not illustrated on the drawings) in the tire radial direction. Additionally, the circumferential reinforcing layer 145 may also be disposed inward of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated on the drawings).

Additionally, in the pneumatic tire 1, the breaking elongation of the tread rubber 15 is preferably not less than 350%. As a result, the strength of the tread rubber 15 is assured and the occurrence of tears in the outermost circumferential main groove 2 is suppressed. Further, the maximum breaking elongation of the tread rubber 15 is not specifically limited, but is constrained by the type of rubber compound of the tread rubber 15.

Furthermore, in the pneumatic tire 1, the hardness of the tread rubber 15 is preferably within a range of not greater than 70. As a result, the strength of the tread rubber 15 is assured and the occurrence of tears in the outermost circumferential main groove 2 is suppressed. Further, the maximum hardness of the tread rubber 15 is not specifically limited, but is constrained by the type of rubber compound of the tread rubber 15.

Here, "rubber hardness" refers to JIS-A hardness in accordance with JIS-K6263.

[Round Shaped Shoulder Portion]

Figure 6:
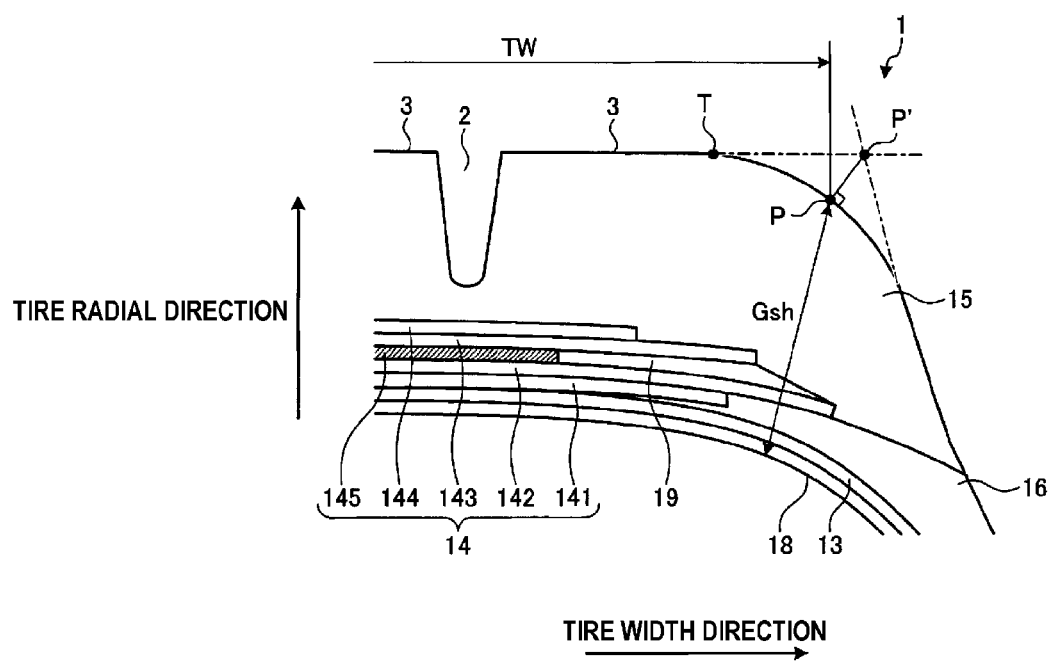
FIG. 6 is an explanatory view illustrating a modified example of the pneumatic tire depicted in FIG. 1.

FIG. 6 is an explanatory view of a modified example of the pneumatic tire depicted in FIG. 1. FIG. 6 illustrates a configuration having a shoulder portion with a round shape.

In the configuration in FIG. 1, the shoulder portion has a square shape, in which the tire ground contact edge T and tread edge P are in accord, as illustrated in FIG. 2. However, the shoulder portion is not limited as such, and may also have a round shape, as illustrated in FIG. 6. In such a case, an intersection P' is taken from the tread portion profile and the side wall portion profile when viewed as a cross-section from the tire meridian direction, and the tread edge P is taken as the bottom of a perpendicular line drawn from the intersection P' to the shoulder portion. Therefore, the tire ground contact edge T and the tread edge P normally are in mutually different locations.

[Belt Edge Cushion Two-Color Structure]

Figure 7:
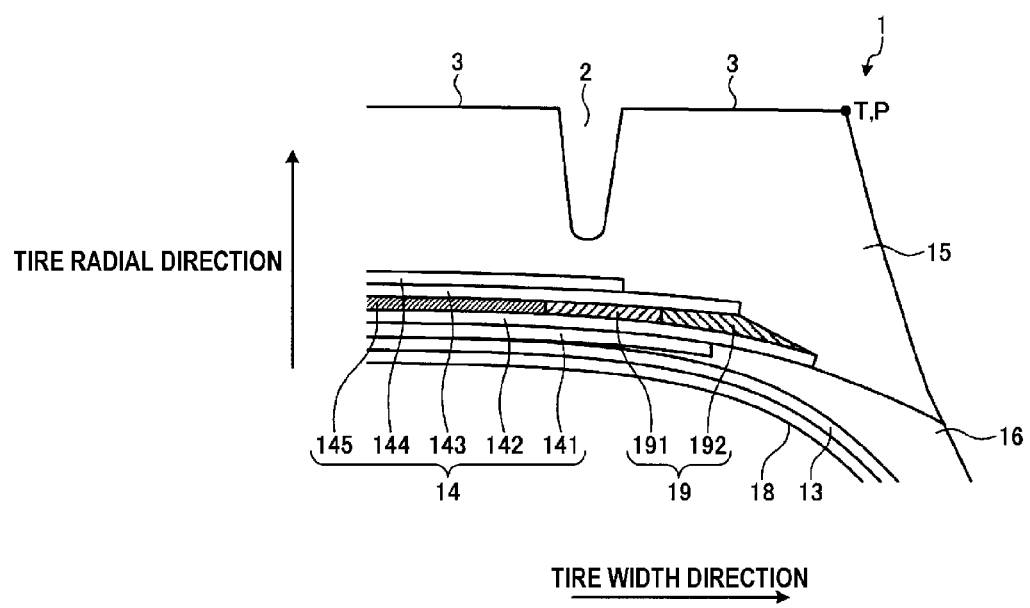
FIG. 7 is an explanatory view illustrating a modified example of the pneumatic tire depicted in FIG. 1.

FIG. 7 is an explanatory view of a modified example of the pneumatic tire depicted in FIG. 1. FIG. 7 is an enlarged view of an end portion of the belt layer 14 outward in the tire width direction. The circumferential reinforcing layer 145 and the belt edge cushion 19 in FIG. 6 are indicated by hatching.

In the configuration illustrated in FIG. 1, the circumferential reinforcing layer 145 is disposed inward of the left and right edges of the narrower cross belt 143 of the pair of cross belts 142, 143 in the tire width direction. The belt edge cushion 19 is disposed sandwiched between the pair of cross belts 142, 143 at a position corresponding to the edge portion of the pair of cross belts 142, 143. Specifically, the belt edge cushion 19 is disposed outward of the circumferential reinforcing layer 145 in the tire width direction so as to be adjacent to the circumferential reinforcing layer 145, and extends from the end portion outward of the circumferential reinforcing layer 145 in the tire width direction to the end portion outward of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship satisfying 0.60≤E/Eco≤0.95. As a result, there is an advantage that the occurrence of separation of rubber materials between the pair of cross belts 142, 143 and in a region outward in the tire width direction of the circumferential reinforcing layer 145 is suppressed.

Conversely, according to the configuration illustrated in FIG. 7, the belt edge cushion 19 in the configuration illustrated in FIG. 1 has a two-color structure composed of a stress relief rubber 191 and an edge portion relief rubber 192. The stress relief rubber 191 is disposed between the pair of cross belts 142, 143 outward of the circumferential reinforcing layer 145 in the tire width direction so as to be adjacent to the circumferential reinforcing layer 145. The edge portion relief rubber 192 is disposed between the pair of cross belts 142, 143 outward of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion of the circumferential reinforcing layer 145 outward in the tire width direction to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship satisfying Ein<Es in the configuration in FIG. 7. Specifically, the modulus Ein of the stress relief rubber 191 and the modulus Es of the circumferential reinforcing layer 145 preferably have a relationship satisfying 0.6≤Ein/Es≤0.9.

Moreover, in the configuration illustrated in FIG. 7, a modulus Ein at 100% elongation of the stress relief rubber 191 and the modulus Eco at 100% elongation of the coating rubber of the cross belts 142, 143 have a relationship satisfying Ein<Eco. Specifically, the modulus Ein of the stress relief rubber 191 and the modulus Eco of the coating rubber preferably have a relationship satisfying 0.6≤Ein/Eco≤0.9.

Additionally a modulus Eout at 100% elongation of the end portion relief rubber 192 and the modulus Ein at 100% elongation of the stress relief rubber 191 preferably have a relationship satisfying Eout<Ein in the configuration in FIG. 5. Additionally, the modulus Ein at 100% elongation of the stress relief rubber 191 preferably is within a range of 4.0 MPa≤Ein≤5.5 MPa.

Since the stress relief rubber 191 is disposed outward of the circumferential reinforcing layer 145 in the tire width direction in the configuration illustrated in FIG. 7, shearing strain of the peripheral rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, separation of the periphery rubber of the circumferential reinforcing layer 145 is suppressed.

Effect

As described above, the pneumatic tire 1 includes a carcass layer 13, a belt layer 14 disposed outward of the carcass layer 13 in the tire radial direction, and a tread rubber 15 disposed outward of the belt layer 14 in the tire radial direction (see FIG. 1). Moreover, the belt layer 14 is formed by laminating the pair of cross belts 142, 143 having a belt angle with an absolute value from 10° to 45° both inclusive and mutually opposite signs, and the circumferential reinforcing layer 145 having a belt angle within a range of ±5° relative to the tire circumferential direction (see FIG. 3). Moreover, the distance Gcc from the tread profile to the tire inner circumferential surface along the tire equatorial plane CL and the distance Gsh from the tread edge P to the tire inner circumferential surface have a relationship satisfying 1.10≤Gsh/Gcc (see FIG. 2).

In such a configuration, because the ratio Gsh/Gcc is set to a high value, the tread face as a whole has a flat (substantially parallel to the tire rotational axis) shape, and further, the volume of the tread rubber 15 (distance Gsh) at the shoulder portion is assured (see FIGS. 1 and 2). As a result, due to the fact that the strain of each of the belt plies 141 to 145 is reduced when the tire contacts the ground (see FIG. 4B and FIG. 5), there is an advantage that the belt-edge-separation resistance performance of the tire is improved.

Additionally, in this pneumatic tire 1, the tread width TW and the width Ws of the circumferential reinforcing layer 145 have the relationship satisfying 0.70≤Ws/TW≤0.90 (see FIG. 1). In such a configuration, due to the fact that the ratio Ws/TW between the tread width TW and the width Ws of the circumferential reinforcing layer 145 is made appropriate, there is an advantage that separation of the edge portion of the circumferential reinforcing layer 145 is suppressed. Specifically, by satisfying the relationship 0.70≤Ws/TW, the width Ws of the circumferential reinforcing layer 145 is appropriately assured, and the strain of the end portions of the surrounding belt plies 142, 143 is appropriately suppressed. Also, by satisfying the relationship Ws/TW≤0.90, due to the fact that the deformation of the end portions of each of the belt plies when the tire contacts the ground is suppressed, the strain of the end portions of each of the belt plies is reduced.

Further, in the pneumatic tire 1, the difference Dr (=R1−R2) between the radius R1 of the circumferential reinforcing layer 145 in the tire equatorial plane CL and the radius R2 at the end portion outward in the tire width direction, and the width Ws of the circumferential reinforcing layer 145 have a relationship satisfying −0.010≤Dr/Ws≤0.010 (see FIG. 2). In such a configuration, the ratio Dr/Ws between the shoulder rounding amount (the difference Dr) of the circumferential reinforcing layer 145 and the width Ws is made appropriate. Specifically, due to the fact that the ratio Dr/Ws is set within the above-described range, there is no curving of the circumferential reinforcing layer 145 and it is disposed in a flat manner in the tire width direction. In this manner, the strain of the end portion of the circumferential reinforcing layer 145 is reduced when the tire contacts the ground. As a result, there is an advantage that the belt-edge-separation resistance performance of the tire is improved.

Furthermore, in the pneumatic tire 1, the belt layer 14 includes the large angle belt 141 having a belt angle with an absolute value from 45° to 70° both inclusive (see FIGS. 1 and 3). As a result, due to the fact that the belt layer 14 is reinforced, there is an advantage that strain of the end portions of the belt layer 14 when the tire contacts the ground is suppressed.

Also, in the pneumatic tire 1, the belt cords of the large angle belt 141 are steel wire, and the large angle belt 141 has the number of ends from 15 ends/50 mm to 25 ends/50 mm both inclusive. As a result, there is an advantage that the number of ends of the belt cords of the large angle belt 141 is made appropriate. Specifically, the strength of the large angle belt 141 is appropriately assured due to the large angle belt 141 having at least 15 ends/50 mm. Moreover, due to the fact that the number of ends of the belt cords is not greater than 25 ends/50 mm, the rubber amount of the coating rubber of the large angle belt 141 is appropriately assured, and separation of the rubber materials between the adjacent belt plies (the cross belt 142 in FIG. 2) is suppressed.

Furthermore, in the pneumatic tire 1, the width Wb1 of the large angle belt 141 and the width Wb3 of the narrower cross belt 143 of the pair of cross belts 142, 143 have a relationship satisfying 0.85≤Wb1/Wb3≤1.05 (see FIG. 3). With such a configuration, the ratio Wb1/Wb3 between the width Wb1 of the large angle belt 141 and the width Wb3 of the narrower cross belt 143 is made appropriate. As a result, there is an advantage that the strain of the end portions of the belt layer 14 when the tire contacts the ground is suppressed.

Further, in the pneumatic tire 1, the distance Dcc along the tire equatorial plane CL from the circumferential reinforcing layer 145 to the tread profile, and the distance De from the end portion of the circumferential reinforcing layer 145 to the tread profile have the relationship satisfying 0.95≤De/Dcc≤1.05 (see FIG. 2). In such a configuration, due to the fact that the circumferential reinforcing layer 145 is disposed substantially parallel to the tire rotational axis, there is an advantage that strain of the end portion of the belt layer 14 when the tire contacts the ground is suppressed.

Further, in the pneumatic tire 1, the breaking elongation λs of the coating rubber of the circumferential reinforcing layer 145 is within a range of λs≥200%. Accordingly, there is an advantage that separation of the coating rubber of the circumferential reinforcing layer 145 is suppressed.

Also, in the pneumatic tire 1, the belt cords that constitute the circumferential reinforcing layer 145 are steel wire, and the circumferential reinforcing layer 145 has the number of end from 17 ends/50 mm to 30 ends/50 mm both inclusive. As a result, there is an advantage that the number of ends of the belt cords of the circumferential reinforcing layer 145 is made appropriate. Specifically, the strength of the circumferential reinforcing layer 145 is properly assured due to the circumferential reinforcing layer 145 having at least 17 ends/50 mm. Moreover, the amount of rubber of the coating rubber of the circumferential reinforcing layer 145 is properly assured and separation of the rubber materials between the contiguous belt plies (the pair of cross belts 142, 143 and the circumferential reinforcing layer 145 in FIG. 3) is suppressed due to the circumferential reinforcing layer 145 having not greater than 30 ends/50 mm.

In the pneumatic tire 1, the elongation of the belt cords that configure the circumferential reinforcing layer 145, when the belt cords are components, is preferably from 1.0% to 2.5% both inclusive when the tensile load is from 100 N to 300 N. As a result, there is an advantage that the effect of suppressing radial growth in the center region is properly assured due to the circumferential reinforcing layer 145.

In the pneumatic tire 1, the elongation of the belt cords that configure the circumferential reinforcing layer 145 as cured tire components is from 0.5% to 2.0% both inclusive when the tensile load is from 500 N to 1000 N. As a result, there is an advantage that the effect of suppressing radial growth in the center region is properly assured due to the circumferential reinforcing layer 145.

In the pneumatic tire 1, the circumferential reinforcing layer 145 is disposed inward of the left and right edges of the narrower cross belt 143 of the pair of cross belts 142, 143 in the tire width direction (see FIG. 3). The pneumatic tire 1 includes the stress relief rubber 191 disposed between the pair of cross belts 142, 143 and outward of the circumferential reinforcing layer 145 in the tire width direction so as to be adjacent to the circumferential reinforcing layer 145, and the end portion relief rubber 192 disposed between the pair of cross belts 142, 143 and outward of the stress relief rubber 191 in the tire width direction and at a position corresponding to the edge portion of the pair of cross belts 142, 143 so as to be adjacent to the stress relief rubber 191 (see FIG. 7).

In such a configuration, there is an advantage that fatigue rupture of the periphery rubber at the edge portion of the circumferential reinforcing layer 145 is suppressed due to the circumferential reinforcing layer 145 being disposed inward of the left and right edge portions of the narrower cross belt 143 of the pair of cross belts 142, 143 in the tire width direction. Since the stress relief rubber 191 is disposed outward of the circumferential reinforcing layer 145 in the tire width direction, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, there is an advantage that separation of the periphery rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying Ein<Eco. As a result, due to the fact that the modulus Ein of the stress relief rubber 191 is made appropriate, there is an advantage that the shearing strain of the periphery rubber between the edge portion of the circumferential reinforcing layer 145 and the cross belts 142, 143 is alleviated.

Furthermore, in the pneumatic tire 1, the modulus Ein at 100% elongation of the stress relief rubber 191, and the modulus Es at 100% elongation of the coating rubber of the circumferential reinforcing layer 145 have a relationship satisfying $0.6 \leq Ein/Es \leq 0.9$. As a result, due to the fact that the ratio Ein/Es is made appropriate, there is an advantage that the shearing strain of the peripheral rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying $0.6 \leq Ein/Eco \leq 0.9$. As a result, due to the fact that the ratio Ein/Eco is made appropriate, there is an advantage that the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of $4.0 \text{ MPa} \leq Ein \leq 5.5 \text{ MPa}$ (see FIG. 7). As a result, due to the fact that the modulus Ein of the stress relief rubber 191 is made appropriate, there is an advantage that the shearing strain of the periphery rubber between the edge portion of the circumferential reinforcing layer 145 and the cross belts 142, 143 is alleviated.

In the pneumatic tire 1, the circumferential reinforcing layer 145 is disposed inward of the left and right edges of the narrower cross belt 143 of the pair of cross belts 142, 143 in the tire width direction (see FIG. 3). Also, the width Wb3 of the narrower cross belt 143 and the distance S from the edge portion of the circumferential reinforcing layer 145 to the edge portion of the narrower cross belt 143 have a relationship satisfying $0.03 \leq S/Wb3 \leq 0.12$. As a result, there is an advantage that a positional relationship S/Wb3 between the edge portions of the cross belts 142, 143 and the edge portions of the circumferential reinforcing layer 145 is made appropriate. Specifically, the relationship satisfying $0.03 \leq S/Wb3$ ensures an appropriate distance between the end portions of the circumferential reinforcing layer 145 and the end portions of the cross belt 143 to suppress the separation of the periphery rubbers at the end portions of these belt plies 145, 143. Additionally, the relationship satisfying $S/Wb3 \leq 0.12$ ensures the width Ws of the circumferential reinforcing layer 145 relative to the width Wb3 of the cross belt 143 to ensure an appropriate hoop effect from the circumferential reinforcing layer 145.

Target of Application

Furthermore, the pneumatic tire 1 is preferably applied to a heavy duty tire with an aspect ratio of not greater than 70% when assembled on a regular rim, inflated with regular internal pressure, with a regular load applied.

EXAMPLES

FIGS. 8A-8B and 9A-9B are tables showing the results of performance testing of pneumatic tires according to the embodiment of the present technology.

In the performance testing, a plurality of mutually differing pneumatic tires were evaluated for belt-edge-separation resistance performance (see FIGS. 8A-8B and FIGS.

9A-9B). In this evaluation, pneumatic tires having a tire size of 315/60 R22.5 were mounted on a rim with a rim size of 22.5×9.00 and inflated to an air pressure of 900 kPa. Further, a low pressure endurance test was performed using an indoor drum tester. Then, a running speed was set to 45 km/h, the load was increased from a load of 34.81 kN by 5% (1.74 kN) every 12 hours, and a running distance when the tire failed was measured. Then, based on the measurement results, index evaluation was performed taking a Conventional Example as a reference (100). In these evaluations, higher scores were preferable. Specifically, an evaluation of 110 or greater indicates dramatic superiority over the Conventional Example.

The pneumatic tires of Working Examples 1 to 29 had the configuration illustrated in FIGS. 1 to 3. Furthermore, main dimensions were set as TW=275 mm, Gcc=32.8 mm, DCC=21.3 mm, and Wb3=245 mm.

In the configuration of FIGS. 1 to 3, the pneumatic tire of the Conventional Example does not have a circumferential reinforcing layer.

As can be seen from the test results, the pneumatic tires 1 of the Working Examples 1 to 29 demonstrate improved belt-edge-separation resistance performance of the tire. Furthermore, comparing the Working Examples 1 to 16 in particular, by satisfying the relationships $1.20 \leq Gsh/Gcc$, $0.70 \leq Ws/TW \leq 0.90$, and $-0.010 \leq Dr/Ws \leq 0.010$, it can be seen that a dramatic superior effect was obtained with respect to the belt-edge-separation resistance performance (an evaluation of at least 110).

The invention claimed is:

1. A pneumatic tire comprising:
   a carcass layer;
   a belt layer disposed outward of the carcass layer in a tire radial direction; and
   a tread rubber disposed outward of the belt layer in the tire radial direction;
   the belt layer being formed by laminating a pair of cross belts having a belt angle with an absolute value from 10° to 45° relative to a tire circumferential direction, both inclusive and mutually opposite signs, a belt cover having a belt angle with an absolute value from 10° to 45° both inclusive, and a circumferential reinforcing layer having a belt angle within a range of ±5° relative to the tire circumferential direction, the belt cover being disposed laminated outward in the tire radial direction of the cross belts and the belt angle of the belt cover having a same sign as the belt angle of an outer side cross belt of the pair of cross belts;
   a distance Gcc from a tread profile to a tire inner circumferential surface along a tire equatorial plane and a distance Gsh from a tread edge to the tire inner circumferential surface having a relationship satisfying $1.20 \leq Gsh/Gcc$;
   a difference Dr between a radius of the circumferential reinforcing layer along the tire equatorial plane and a radius at an end portion outward in the tire width direction, and the width Ws of the circumferential reinforcing layer having a relationship satisfying $-0.010 \leq Dr/Ws \leq -0.002$; and
   a distance Dcc from the circumferential reinforcing layer to the tread profile along the tire equatorial plane and a distance De from the end portion of the circumferential reinforcing layer to the tread profile having a relationship satisfying $0.95 \leq De/Dcc \leq 1.05$.

2. The pneumatic tire according to claim 1, wherein a tread width TW and a width Ws of the circumferential reinforcing layer have a relationship satisfying $0.70 \leq Ws/TW \leq 0.90$.

3. The pneumatic tire according to claim 1, wherein the belt layer has a large angle belt having a belt angle with an absolute value from 45° to 70° relative to the tire circumferential direction, both inclusive.

4. The pneumatic tire according to claim 3, wherein belt cords of the large angle belt are steel wire, and the large angle belt has a number of ends from 15 ends/50 mm to 25 ends/50 mm both inclusive.

5. The pneumatic tire according to claim 3, wherein a width Wb1 of the large angle belt and a width Wb3 of a narrower cross belt of the pair of cross belts have a relationship satisfying $0.85 \leq Wb1/Wb3 \leq 1.05$.

6. The pneumatic tire according to claim 1, wherein a breaking elongation $\lambda s$ of a coating rubber of the circumferential reinforcing layer is within a range of $\lambda s \geq 200\%$.

7. The pneumatic tire according to claim 1, wherein belt cords of the circumferential reinforcing layer are steel wire, and the circumferential reinforcing layer has a number of ends from 17 ends/50 mm to 30 ends/50 mm both inclusive.

8. The pneumatic tire according to claim 1, wherein elongation of belt cords that configure the circumferential reinforcing layer, when the belt cords are components, is from 1.0% to 2.5% both inclusive when a tensile load is from 100 N to 300 N.

9. The pneumatic tire according to claim 1, wherein elongation of belt cords that configure the circumferential reinforcing layer as cured tire components is from 0.5% to 2.0% both inclusive when a tensile load is from 500 N to 1000 N.

10. The pneumatic tire according to claim 1, wherein the circumferential reinforcing layer is disposed inward of left and right edges of the narrower cross belt of the pair of cross belts in the tire width direction, the tire further comprising:
    a stress relief rubber disposed between the pair of cross belts and disposed outward of the circumferential reinforcing layer in the tire width direction so as to be adjacent to the circumferential reinforcing layer; and
    an end portion relief rubber disposed between the pair of cross belts and disposed outward of the stress relief rubber in the tire width direction and in a position corresponding to an edge portion of the pair of cross belts so as to be adjacent to the stress relief rubber.

11. The pneumatic tire according to claim 10, wherein a modulus Ein at 100% elongation of the stress relief rubber and a modulus Eco at 100% elongation of coating rubber of the pair of cross belts have a relationship satisfying Ein<Eco.

12. The pneumatic tire according to claim 10, wherein the modulus Ein at 100% elongation of the stress relief rubber and a modulus Es at 100% elongation of coating rubber of the circumferential reinforcing layer have a relationship satisfying $0.6 \leq Ein/Es \leq 0.9$.

13. The pneumatic tire according to claim 10, wherein the modulus Ein at 100% elongation of the stress relief rubber and the modulus Eco at 100% elongation of coating rubber of the pair of cross belts have a relationship satisfying $0.6 \leq Ein/Eco \leq 0.9$.

14. The pneumatic tire according to claim 10, wherein the modulus Ein at 100% elongation of the stress relief rubber is within a range of $4.0 \text{ MPa} \leq Ein \leq 5.5 \text{ MPa}$.

15. The pneumatic tire according to claim 1, wherein the circumferential reinforcing layer is disposed inward of left and right edges of the narrower cross belt of the pair of cross belts in the tire width direction, and a width Wb3 of the narrower cross belt and a distance S from an edge portion of the circumferential reinforcing layer to an edge portion of the narrower cross belt are within a range of $0.03 \leq S/Wb3$.

16. The pneumatic tire according to claim 1 applied to a heavy duty tire with an aspect ratio of 70% or less.

17. The pneumatic tire according to claim 1, wherein $1.25 \leq Gsh/Gcc$.

18. The pneumatic tire according to claim 1, wherein $1.00 < De/Dcc \leq 1.05$.

19. The pneumatic tire according to claim 1, wherein the circumferential reinforcing layer terminates inwardly in a tire width direction of an outermost circumferential main groove formed in the tread rubber.

20. The pneumatic tire according to claim 1, wherein the reinforcing layer terminates inward of the outermost circumferential main groove in the tire width direction.

* * * * *